United States Patent
Alexander et al.

(10) Patent No.: US 9,135,005 B2
(45) Date of Patent: Sep. 15, 2015

(54) HISTORY AND ALIGNMENT BASED CRACKING FOR STORE MULTIPLE INSTRUCTIONS FOR OPTIMIZING OPERAND STORE COMPARE PENALTIES

(75) Inventors: Khary J. Alexander, Poughkeepsie, NY (US); Fadi Busaba, Poughkeepsie, NY (US); Brian Curran, Saugerties, NY (US); Bruce Giamei, Poughkeepsie, NY (US); Christian Jacobi, Poughkeepsie, NY (US); James R. Mitchell, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 12/695,687

(22) Filed: Jan. 28, 2010

(65) Prior Publication Data

US 2011/0185158 A1    Jul. 28, 2011

(51) Int. Cl.
| | | |
|---|---|---|
| G06F 15/00 | (2006.01) | |
| G06F 9/00 | (2006.01) | |
| G06F 9/44 | (2006.01) | |
| G06F 7/38 | (2006.01) | |
| G06F 9/30 | (2006.01) | |
| G06F 9/38 | (2006.01) | |

(52) U.S. Cl.
CPC .......... *G06F 9/30043* (2013.01); *G06F 9/3017* (2013.01); *G06F 9/3824* (2013.01); *G06F 9/3838* (2013.01)

(58) Field of Classification Search
None
See application file for complete search history.

(56) References Cited

U.S. PATENT DOCUMENTS

| | | | |
|---|---|---|---|
| 4,604,684 A | 8/1986 | Epstein | |
| 4,652,991 A | 3/1987 | Yamano | |
| 4,853,840 A | 8/1989 | Shibuya | |
| 4,858,104 A | 8/1989 | Matsuo et al. | |
| 4,873,629 A | 10/1989 | Harris et al. | |
| 5,073,855 A | 12/1991 | Staplin et al. | |
| 5,097,407 A | 3/1992 | Hino et al. | |
| 5,150,468 A | 9/1992 | Staplin et al. | |
| 5,297,266 A | 3/1994 | Tanaka | |

(Continued)

FOREIGN PATENT DOCUMENTS

| | | |
|---|---|---|
| EP | 378816 | 12/1989 |
| EP | 0374526 | 6/1990 |

(Continued)

OTHER PUBLICATIONS

Tendler et al. (POWER4 System Microarchitecture, Jan. 2002, pp. 5-25).*

(Continued)

*Primary Examiner* — George Giroux
(74) *Attorney, Agent, or Firm* — Fleit Gibbons Gutman Bongini & Bianco PL; Thomas Grzesik

(57) ABSTRACT

Store multiple instructions are managed based on previous execution history and their alignment. At least one store multiple instruction is detected. A flag is determined to be associated with the at least one store multiple instruction. The flag indicates that the at least one store multiple instruction has previously encountered an operand store compare hazard. The at least one store multiple instruction is organized into a set of unit of operations. The set of unit of operations is executed. The executing avoids the operand store compare hazard previously encountered by the at least one store multiple instruction.

20 Claims, 12 Drawing Sheets

(56) References Cited

U.S. PATENT DOCUMENTS

| | | | |
|---|---|---|---|
| 5,434,985 | A | 7/1995 | Emma et al. |
| 5,467,473 | A | 11/1995 | Kahle et al. |
| 5,488,707 | A | 1/1996 | Phillips et al. |
| 5,500,947 | A | 3/1996 | Uhler et al. |
| 5,664,215 | A * | 9/1997 | Burgess et al. ............ 712/23 |
| 5,666,506 | A | 9/1997 | Hesson et al. |
| 5,694,565 | A | 12/1997 | Kahle et al. |
| 5,717,910 | A | 2/1998 | Henry |
| 5,721,855 | A | 2/1998 | Hinton et al. |
| 5,742,805 | A | 4/1998 | Kulkarni et al. |
| 5,752,273 | A | 5/1998 | Nemirovsky et al. |
| 5,781,752 | A | 7/1998 | Moshovos et al. |
| 5,802,359 | A | 9/1998 | Webb et al. |
| 5,826,089 | A | 10/1998 | Ireton |
| 5,867,684 | A | 2/1999 | Kahle et al. |
| 5,909,567 | A | 6/1999 | Novak et al. |
| 5,918,031 | A | 6/1999 | Morrison et al. |
| 6,058,470 | A | 5/2000 | Webb et al. |
| 6,092,185 | A | 7/2000 | Slegel et al. |
| 6,134,646 | A | 10/2000 | Feiste et al. |
| 6,219,742 | B1 | 4/2001 | Stanley |
| 6,336,183 | B1 | 1/2002 | Le et al. |
| 6,654,869 | B1 | 11/2003 | Kahle et al. |
| 6,697,939 | B1 | 2/2004 | Kahle |
| 6,999,952 | B1 | 2/2006 | Pham |
| 7,082,517 | B2 | 7/2006 | Busaba et al. |
| 7,085,917 | B2 | 8/2006 | Busaba et al. |
| 7,159,102 | B2 | 1/2007 | Irie et al. |
| 7,162,621 | B2 | 1/2007 | Kissell |
| 7,269,715 | B2 | 9/2007 | Le et al. |
| 2002/0152259 | A1 | 10/2002 | Trong et al. |
| 2005/0223292 | A1 | 10/2005 | Lee et al. |
| 2006/0053343 | A1 | 3/2006 | Hayem |
| 2007/0204138 | A1 | 8/2007 | Savransky et al. |
| 2007/0288725 | A1* | 12/2007 | Luick ............ 712/225 |
| 2009/0210659 | A1 | 8/2009 | Carlough et al. |
| 2009/0240914 | A1 | 9/2009 | Malley et al. |
| 2009/0240919 | A1 | 9/2009 | Alexander et al. |
| 2010/0250802 | A1* | 9/2010 | Waugh et al. ............ 710/100 |

FOREIGN PATENT DOCUMENTS

| | | | |
|---|---|---|---|
| EP | 374830 | A3 | 3/1992 |
| EP | 0514092 | | 11/1992 |
| JP | 02183830 | | 7/1990 |
| JP | 04333141 | | 11/1992 |
| JP | 0713758 | | 1/1995 |
| JP | 07129399 | | 5/1995 |
| JP | 2000259408 | A | 9/2000 |
| JP | 2001229024 | A2 | 8/2001 |
| JP | 2004342102 | A2 | 12/2004 |

OTHER PUBLICATIONS

Michael J, Flynn. Instruction Sets and Their Implementations. IEEE.. EE Department, CSL. Stanford, CA. Dec. 27 to Dec. 29, 1990.

Michael Gschwind and Kemal Ebcioglu and Erik Altman and Sumedh Sathaye. Binary Translation and Architecture Convergence Issues for IBM System/390. In Preceedings of ICS-2000 Sante Fe, New Mexico, Aug. 8-10, 2000.

Abraham Ziv and Merav Aharoni and Sigal Asaf. Solving Range Constraints for Binary Floating Instructions. Haifa University. 2003. International Business Machines Research Labs. Haifa, Israel.

Fadi Busaba and Timothy Slegel and Steven Carlough and Christopher Krygowski and John G. Rell. The Design of the Fixed Point Unit for z990 Microprocessor. GLSVLSI' 04. 2004. Boston.

Gideon D, Intrater and Iian Y. Spikkinger. Performance Evaluation of a Decoded Instruction Cache for Variable Instruction Length Computers. IEEE. Oct. 2004.

Gang Quan and James P. Davis and Siddhaveerasharan Devarkal and Duncan A . Buell. High Level Synthesis for Large Bit Width Multipliers on FPGAS: A Case Study. Codes+ISSS' 05. 2005. New Jersey.

Jose Rizo Morente and Miguel Casas-Sanchez and C.J. Bleakley. Dynamic Current Modeling at the Instruction Level. ISLPED' 06. 2006. Tegemsee, Germany.

Non-Final Office Action dated Nov. 21, 2012 received for U.S. Appl. No. 12/774,299.

Final Office Action dated Mar. 14, 2013 received for U.S. Appl. No. 12/774,299.

Angiulli et al., "Exclusive or Performance Enhancement", IBM TDB, Sep. 1, 1981, pp. 1852-1854.

Ngai et al., "Fast Destructive Overlap Move Instruction Execution Algorithm", IBM TDB, Dec. 1, 1982, pp. 3569-3576.

Ngai et al.,"Destructive Overlap Detection Hardware", IBM TDB, Jun. 1, 1976, pp. 61-64.

Gwennap, Linley "Intel's P6 Uses Decoupled Superscalar Design", Feb. 16, 1995, Microprocessor Report, vol. 9, No. 2, pp. 1-7.

Non-Final Office Action dated Apr. 4, 2013 received for U.S. Appl. No. 12/718,685.

Final Office Action dated Oct. 17, 2013 received for U.S. Appl. No. 12/718,685.

International Search Report & Written Opinion dated Sep. 7, 2011 received for PCT/EP2011/056429.

Non-Final Office Action dated Mar. 28, 2014 received for U.S. Appl. No. 12/718,685.

International Search Report & Written Opinion dated Dec. 6, 2010 received for PCT/EP2010/067055.

IBM, "Enterprise Systems Architecture/370 Principles of Operation", Sep. 1989, pp. 3-24, 4-3 thru 4-12.

IBM, "z/Architecture Principles of Operation", Eighth Edition, Feb. 2009, pp. 3-36, 4-3 thru 4-12, available at http://publibfp.dhe.ibm.com/epubs/pdf/dz9zr007.pdf.

* cited by examiner

HISTORY AND ALIGNMENT BASED CRACKING FOR STORE MULTIPLE INSTRUCTIONS FOR OPTIMIZING OPERAND STORE COMPARE PENALTIES

FIELD OF THE INVENTION

The present invention generally relates to microprocessors, and more particularly relates to managing store multiple instructions.

BACKGROUND OF THE INVENTION

A microprocessor that is capable of issuing and executing machine instructions out of order, in general, permits loads to be executed ahead of stores. This feature permits a large performance advantage provided that the load address and the store address do not both have the same physical address. In typical programs, the frequency that a load proceeds ahead of the store and that their physical address matches is low. However, since the discovery of this store violation condition is typically late in the instruction execution pipeline, the recovery penalty can be quite severe. For example, the recovery process typically involves invalidating the load instruction that caused the violation and all newer instructions in program order beyond the load instruction, and second reissuing the load instruction. Conventional mechanisms for managing store-compare hazards generally do not manage these hazards very effectively.

SUMMARY OF THE INVENTION

In one embodiment, a method for managing multiple store instructions is disclosed. The method comprises detecting at least one store multiple instruction is detected. A flag is determined to be associated with the at least one store multiple instruction. The flag indicates that the at least one store multiple instruction has previously encountered an operand store compare hazard. The at least one store multiple instruction is organized into a set of unit of operations. The set of unit of operations is executed. The executing avoids the operand store compare hazard previously encountered by the at least one store multiple instruction.

In another embodiment, a method for managing multiple store instructions is disclosed. The method comprises detecting at least one store multiple instruction. A flag is determined to be associated with the at least one store multiple instruction. The flag indicates that the at least one store multiple instruction has not previously encountered an operand store compare hazard. The at least one store multiple instruction is organized into a set of unit of operations based on the flag indicating that the at least one store multiple instruction has not previously encountered an operand store compare hazard. The set of unit of operations is executed. The executing avoids the operand store compare hazard previously encountered by the at least one store multiple instruction.

In yet another embodiment, an information processing system for managing multiple store instructions is disclosed. The information processing system comprises a memory and a processor that is communicatively coupled to the memory. The information processing system further comprises a cracking unit that is communicatively coupled to the memory and the processor. The cracking unit is for detecting at least one store multiple instruction is detected. A flag is determined to be associated with the at least one store multiple instruction. The flag indicates that the at least one store multiple instruction has previously encountered an operand store compare hazard. The at least one store multiple instruction is organized into a set of unit of operations. The set of unit of operations is executed. The executing avoids the operand store compare hazard previously encountered by the at least one store multiple instruction.

In another embodiment, a computer program product for managing multiple store instructions is disclosed. The computer program product comprises a storage medium that is readable by a processing circuit. The computer program product stores instructions for execution by the processing circuit for performing a method. The method comprises detecting at least one store multiple instruction is detected. A flag is determined to be associated with the at least one store multiple instruction. The flag indicates that the at least one store multiple instruction has previously encountered an operand store compare hazard. The at least one store multiple instruction is organized into a set of unit of operations. The set of unit of operations is executed. The executing avoids the operand store compare hazard previously encountered by the at least one store multiple instruction.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
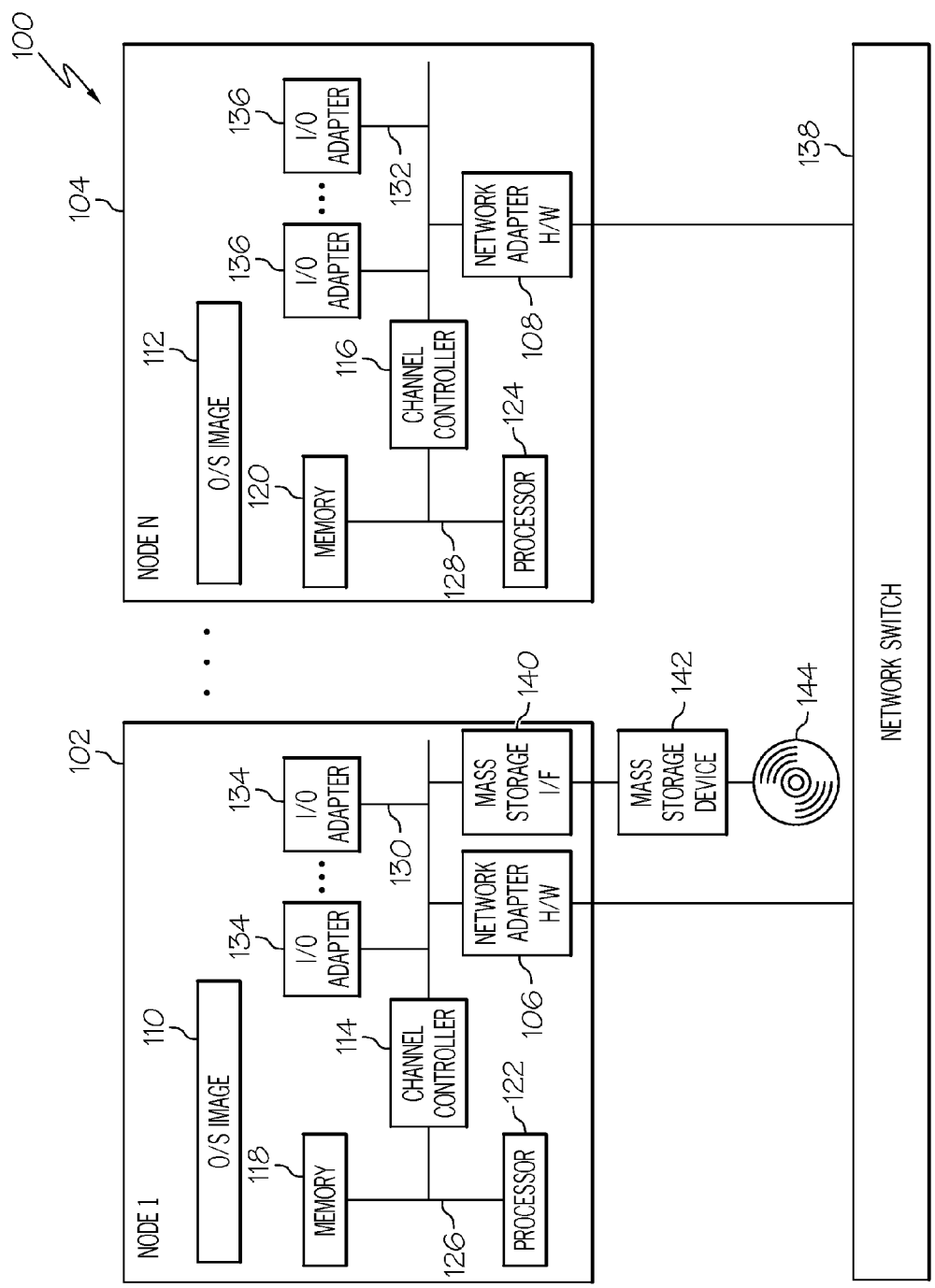
FIG. 1 illustrates one example of an operating environment according to one embodiment of the present invention.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Overview

In microprocessors that execute load and store instructions out-of-order, cache data dependencies present a challenge for designers. These data hazards (operand-store-compare (OSC) hazards) are prevalent and, therefore, require detection and store data bypassing. OSC hazards are either load-hits-store (LHS) or store-hit-load (SHL) hazards. An LHS hazard occurs when a load instruction is issued after a store instruction. This load instruction hits against the store instruction, thereby resulting in these two instruction dependent upon each other. In other words, an LHS hazard occurs when the load range lies within the store range. Store data bypass from the store instruction to the load instruction is possible if the store data is known when the load cache address is calculated.

There are two types of LHS hazards non-forwardable LHS hazards (nf-LHS) and persistent non-forwardable LHS hazards (persistent nf-LHS). With respect to an nf-LHS, a store instruction executes its address calculation, but the data for the store instruction is delayed, e.g. because the data-producing instruction is has a long latency (e.g. divide). Then a load instruction executes before the store data is written into the Store Queue (STQ). The load instruction detects that it is dependent on the store instruction, but the load instruction cannot perform store-data-forwarding since the data is not available. Therefore, the load instruction needs to reject and retry later on after the store data has become available.

A persistent nf-LHS hazard is similar to an nf-LHS situation discussed above. For example, certain store instructions (e.g. if they are line-crossing, or if the length>8 bytes) may not be forwardable in general (per the specific STQ design). In this situation, the load instruction, even if the store data is already written into the STQ, needs to recycle over and over again until the store data is written back into the L1 cache.

With respect to an SHL hazard, the store instruction is older than a load instruction and the store address hits (matches) against the load address. For example, assume that a Store to address A is followed by a Load to address A. In one situation the load instruction can execute before the store instruction, i.e., the STQ does not comprise the store address information. Therefore, the STQ does not indicate a conflict. Once the load instruction finishes execution, the store instruction executes and detects the conflict against the already finished load instruction and flushes the pipeline to stop the load instruction and any subsequent instruction. This is a very costly operation since a large amount of work needs to be redone (the load instruction and all future instructions that were already executed speculatively before).

Additional complexity for cache data dependency occurs when the store instruction stores a long stream of bytes as in store multiple instructions where the number of bytes stored ranged from 4 to 128. Conventional mechanisms for managing the above hazards and the additional complexity related to store multiple instructions do not effectively handle the hazards and the complexities of store multiple instructions very effectively.

However, one advantage of the various embodiments of the present invention is that the hazards discussed above are effectively avoided when executing store multiple instructions. An OSC history table, in at least one embodiment, is created that identifies store multiple (STM) instructions that have previously encountered an OSC hazard. STM instructions associated with an OSC history flag can be selectively cracked to a set of independent store instructions to improve LHS and SHL penalties. An STM instruction without a history flag is handled to not exhaust store queue resources. LHS against data produced from the STM is treated like persistent nf-LHS. On the other hand, an STM instruction with OSC history is handled similar to independent 8 byte stores. This occupies additional store queue entries and additional issue bandwidth, but any LHS is treated similar to a forwardable LHS. Each STM is handled differently depending on an operand store compare history flag for optimizing performance.

Operating Environment

FIG. 1 shows an exemplary operating environment applicable to various embodiments of the present invention. In particular, FIG. 1 shows a parallel-distributed processing system in which one embodiment of the present invention is implemented. In this embodiment, the parallel-distributed processing system 100 operates in an SMP computing environment. In an SMP computing environment, parallel applications can have several tasks (processes) that execute on the various processors on the same processing node. The parallel-distributed processing system 100 executes on a plurality of processing nodes 102 and 104 coupled to one another node via a plurality of network adapters 106 and 108. Each processing node 102 and 104 is an independent computer with its own operating system image 110 and 112, channel controller 114 and 116, memory 118 and 120, and processor(s) 122 and 124 on a system memory bus 126 and 128. A system input/output bus 130 and 132 couples I/O adapters 134 and 136 and communication adapter 106 and 108. Although only one processor 122 and 124 is shown in each processing node 102 and 104 for simplicity, each processing node 102 and 104 can have more than one processor. The communication adapters are linked together via a network switch 138.

Also, one or more of the nodes 102, 104 comprises mass storage interface 140. The mass storage interface 140 is used to connect mass storage devices 142 to the node 102. One specific type of data storage device is a computer readable medium such as a Compact Disc ("CD") drive, which may be used to store data to and read data from a CD 144 or DVD. Another type of data storage device is a hard disk configured to support, for example, JFS type file system operations. In some embodiments, the various processing nodes 102 and 104 are able to be part of a processing cluster. The present invention is not limited to an SMP environment. Other architectures are applicable as well, and further embodiments of the present invention can also operate within a single system.

Processor Core

Figure 2:
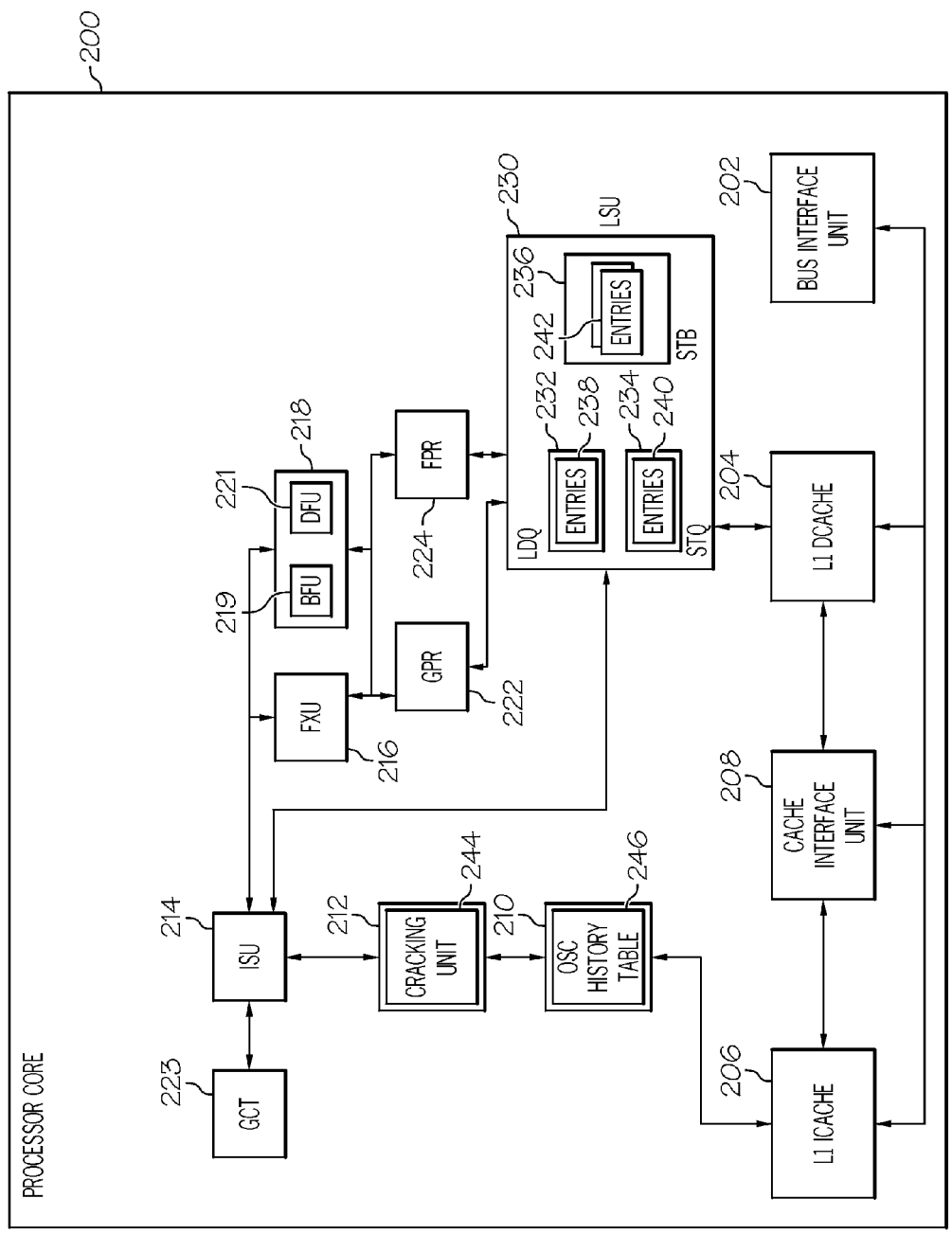
FIG. 2 illustrates a detailed view of a processing core according to one embodiment of the present invention.

According to one embodiment, FIG. 2 illustrates one example of a processor core 200 within a processor 122, 124 for performing workaround operations based on active events in the processor pipeline. It should be noted that the configuration shown in FIG. 2 is only one example applicable to the presently claimed invention. The processor core 200, in one embodiment, comprises a bus interface unit 202 that couples the processor core 200 to other processors and peripherals. The bus interface unit 202 also connects an L1 Dcache 204 for storing data values, an L1 Icache 206 for storing program instructions, and a cache interface unit 208 to external memory, processor, and other devices.

The L1 Icache 206 provides loading of instruction streams in conjunction with an instruction fetch unit IFU 210, which prefetches instructions and may include speculative loading and branch prediction capabilities. These fetched instruction codes are decoded by an IDU 212 into instruction processing data. Once decoded, the instructions are dispatched to an instruction sequencer unit (ISU) 214. The ISU 214 controls sequencing of instructions issued to various execution units such as one or more fixed point units (FXU) 216 for executing general operations and one or more floating point units (FPU)

218 for executing floating point operations. The floating point unit(s) 218 can be a binary point floating unit 219, a decimal point floating unit 221, and/or the like. It should be noted that the FUX(s) 216, in one embodiment, comprises multiple FXU pipelines, which are copies of each other. The ISU 214 is also coupled to one or more load/store units (LSU) 230 via one or more LSU pipelines, where the LSU execute loads and stores operations. These multiple LSU pipelines are treated as execution units for performing loads and stores and address generation for branches.

A set of global completion tables (GCT) 223 track the instructions issued by ISU 214 via tags until the particular execution unit targeted by the instruction indicates the instructions have completed execution. The FXU 216, FPU 218, and LSU 230 are coupled to various resources such as general-purpose registers (GR or GPR) 222, floating point registers (FPR) 224. The GR 222 and FPR 224 provide data value storage for data values loaded and stored from the L1 Dcache 204 by a load store unit (LSU) 230. The GR 222 and FPR 224 also provide data as operands to FXU 216, FPU 218 and LSU 230. The ISU maps the GPRs and FPRs (and some other state control bits like condition code) to physical copies that are referenced by execution.

In addition, to the configuration of the processor core 200 discussed above, in gone embodiment, the LSU 230 comprises a load queue (LDQ) 232, a store queue (STQ) 234, and a store buffer (STB) 236. The LDQ 232 and the STQ 234 each comprise entries 238, 240, respectively, that track additional information associated with outstanding load and store instructions. For example, the entries 238 of the LDQ 232 comprise the starting address and ending address of a corresponding load instruction. The entries 240 of the STQ 234 comprise the starting address and the ending address of corresponding store data. The STB 236 comprises entries 242 where a corresponding store instruction saves its data prior to writing the data back the cache 204.

In one embodiment, the IDU 212 comprises a cracking unit 244. The cracking unit 244 organizes/breaks a complex instruction into simpler units. Stated differently, the cracking unit 244 organizes an instruction such as an STM instruction into a set of units of operation (Uops) that can be handled in parallel paths. The cracking unit is discussed in greater detail below. In one embodiment, the IFU 210 comprises an operand-store-compare (OSC) history table 246 for storing information associated with instructions that have previously encountered an OSC hazard. The OSC history table 246 is discussed in greater detail below.

OSC Hazard Management

As discussed above, OSC hazards can occur in a processor that executes load and store instructions out-of-order. OSC hazards can also occur in an in-order processor, but the window that OSC hazard can occur is wider in an out-of-order design. Therefore, in addition to the general processing mechanisms discussed above with respect to FIG. 1, one or more of the following embodiments can also be implemented within the processor core 200 to predict, avoid, and/or reduce the penalty of these OSC hazards when executing STM instructions. First, a discussion is given on how the OSC history table entries are generated. Then a discussion is given on how these entries are used and how an STM instruction can be cracked to optimize LHS and SHL penalties.

In general, every load instruction is allocated an entry in the LDQ 232 at dispatch time, which saves the address of each load after it executed until completion. Every store instruction is allocated an entry at dispatch time in the STQ 234, which similarly saves the store address, from execution of the store address computation until the store has completed and has written the L1 cache 204. However, based on the type of hazard detected, an STQ entry and an LDQ entry can also comprise additional information to predict, avoid, and/or reduce the penalties OSC hazards.

For example, when an executed STM instruction (e.g., a store instruction that stores at multiple registers) detects an SHL hazard and performs an SHL flush against an LDQ entry, the STM instruction sets an OSC hazard flag in its own STQ entry, and also sets an OSC hazard bit in the (oldest) LDQ entry the instruction compares against. These OSC hazard flags indicate that an SHL hazard has been encountered by these instructions. It should be noted that this LDQ entry is invalidated due to the resulting flush, but the OSC hazard flag is retained in the LDQ 232. When the processor pipeline starts refetching and re-executing the flushed instructions, the same load is allocated the same LDQ entry, which now has the OSC hazard flag set from before the flush.

In another example, the LSU 108 executes a load instruction and compares this load to a corresponding entry in the STQ 234. The load instruction determines that store-data-forwarding cannot be performed. For example, the load is executing prior to the store data being written to the STQ (nf-LHS) or store-data-forwarding is not allowed even when the data is available (persistent nf-LHS). The load instruction then sets an OSC hazard flag in the STQ entry it compared against if the load instruction detected an nf-LHS hazard. This OSC hazard flag indicates that the instruction has encountered an nf-LHS hazard. Alternatively, the load instruction sets an OSC hazard flag in the STQ entry it compared against if the load instruction detected a persistent nf-LHS hazard. This OSC hazard flag indicates that the instruction has encountered a persistent nf-LHS hazard. The load instruction also sets the same OSC hazard flag in its own entry in the LDQ 120.

As can be seen, an OSC hazard flag (or history flag) is associated with an STM instruction by either the STM instruction detecting an SHL hazard or a load instruction detecting an LHS hazard. It should be noted that any type of indicator (flags, bits, etc.) can be used to indicate than an instruction has previously encountered an OSC hazard. Also, an OSC hazard flag in one of the queues 232, 234 matches at least one OSC hazard flag in the other queue 232, 234 since the load or store instruction sets the same bit in an entry of the other queue as it sets in an entry of its own queue.

When the STM instruction has completed and writes its data back to the L1 cache 204, the STM instruction determines if it has OSC hazard flag information in the STQ 234. If so, the STM instruction indicates this to the IFU 210. The IFU 210 then generates an entry in an OSC history table 246, for this particular STM instruction comprising the instruction address of the STM instruction and OSC hazard flag information under the instruction address of the STM instruction. Also, when the store data instruction is written back to the L1 cache 204, the STQ 234 informs the ISU 214 of the STQ-entry-number (stag) of that given STM instruction within the STQ 234.

Once the load instruction completes, the load instruction determines if it has OSC hazard flag information in the LDQ 232. If so, the load instruction indicates this to the IFU 210. The IFU 210, in one embodiment, then generates an entry in an OSC history table 246 for this particular load instruction. An entry is created in the OSC prediction table 246 based on the instruction address of the load instructions and remember the OSC hazard flag(s) associated with this load instruction.

Figure 3:
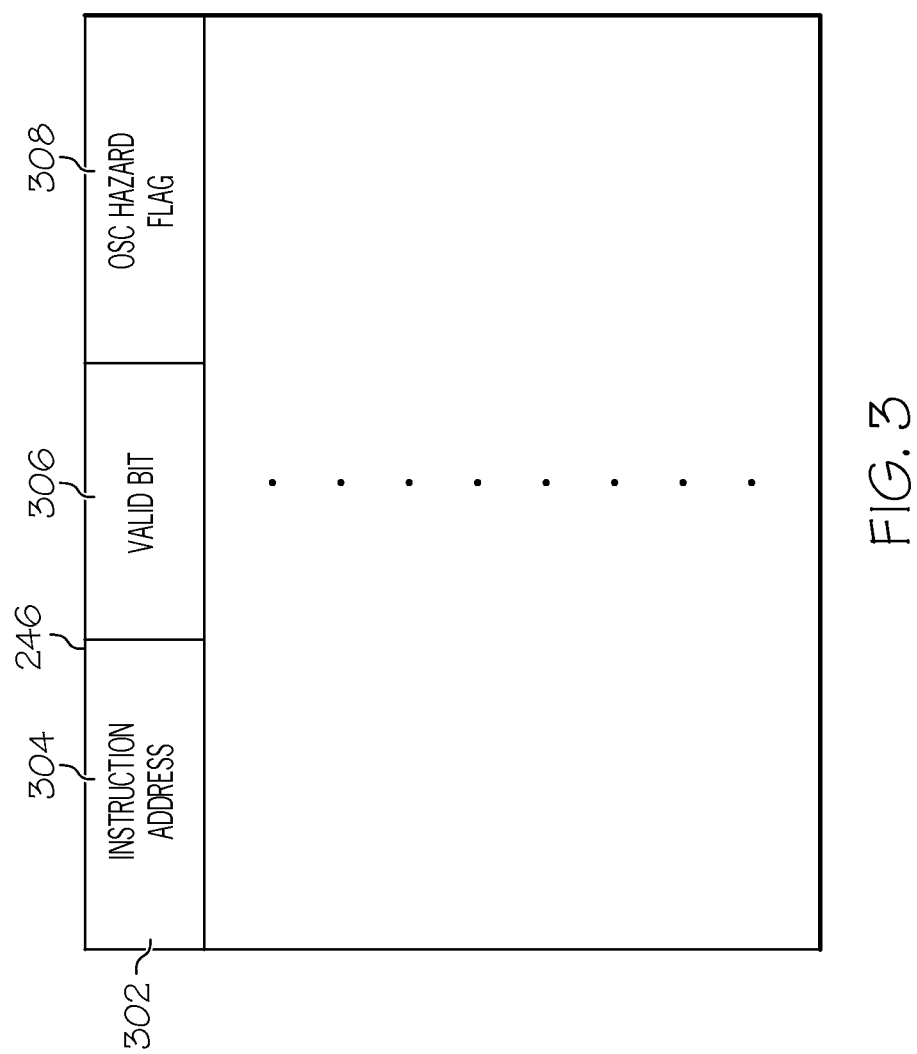
FIG. 3 shows one example of an operand store compare hazard history table entry according to one embodiment of the present invention.

FIG. 3 shows one example of an entry within the OSC history table 246. In particular, FIG. 3 shows that the entry 302 comprises the instruction address 304 of the instruction, an entry valid bit 306, and one or more hazard indicating flags 308. The OSC hazard indicating flag(s) 308 are set based on the information obtained from the corresponding instruction, as discussed above. It should also be noted that various techniques can be used to generate the history table 246 based on instruction addresses. For example, techniques directed to overflows (least-recently-used techniques), read/write conflicts (queuing), and similar techniques for prediction tables can be used. A more detailed discussion of the OSC history table and the OSC hazard flags is given in the commonly owned and co-pending U.S. patent application Ser. No. 12/644,923, entitled "Predicting and Avoiding Operand-Store-Compare Hazards In Out-Of-Order Microprocessors", filed on Dec. 22, 2009 which is hereby incorporated by reference in its entirety.

The OSC hazard flags create dependencies between load and store instructions including multiple loads and multiple stores. The OSC history table 246 records these dependencies as discussed above. Therefore, all load instructions associated with an OSC hazard flag are made dependent on all prior store instructions associated with the same type of OSC hazard flag. This effectively delays execution of the load instructions until after all store instructions associated with the same type of OSC hazard flag as the load instruction have executed their address calculation and written their data into the STQ. For load/stores associated with a persistent nf-LHS hazard the load instruction is made dependent on the L1 cache writeback of the last store instruction that was associated with a persistent nf-LHS hazard. This effectively prevents persistent nf-LHS hazards.

Once the history table 246 has been populated, each time an STM instruction is fetched by the IFU 210 the IFU 210 sends the STM instruction into the pipeline for decoding by the IDU 212. The IFU 210 also sends the corresponding OSC hazard flag information (OSC history information) to the IDU 212 as well. Therefore, the IDU 212 receives OSC hazard flag information and the STM instruction from the IDU 212. The OSC hazard flag information indicates whether or not the STM instruction has previously encountered an OSC hazard. It should be noted that the IDU 212 can also query the OSC history table 246 as well by using the instruction address of the fetched STM instruction. This OSC history information is used by the IDU 212 to determine whether the given fetched STM instruction such as an STM instruction has previously encountered an OSC hazard.

For example, in one embodiment, the OSC hazard flag is set to a 0 or a 1. If the OSC hazard flag is set to 0 this indicates that the instruction has not previously encountered an OSC hazard. If the OSC hazard flag is set to 1 this indicates that the STM instruction has previously encountered an OSC hazard. It should be noted that the present invention is not limited to setting a 0 or a 1 in an OSC hazard flag and any other type of indication can be used to indicate OSC hazard history for an instruction.

In addition to analyzing the OSC hazard flag, the IDU 212 also analyzes the instruction text to determine the data alignment of the store data associated with the STM instruction. In a non-limiting example, the IDU 212 analyzes bit 2 of the displacement field, which is the same as bit 29 of the instruction text, to determine the data alignment structure of the store data associated with the STM instruction. This data alignment determination is discussed in greater detail below.

It should be noted that an STM instruction can be one of two types, a first type that reads 32-bits from GRs 222 and a second type that reads 64-bits from GRs. The 32-bit type store multiple instructions can be referred to as an STM, STMI, STMH, or STMY instructions. The 64-bit type store multiple instructions can be referred to as STMG or STMGI instructions. In one embodiment, the IDU 212 cracks, via the cracking unit 244, the STMx ("x" being generic) instruction into a set of Uops based on the OSC hazard flag information and, in some embodiments, the data alignment structure as well.

Figure 4:
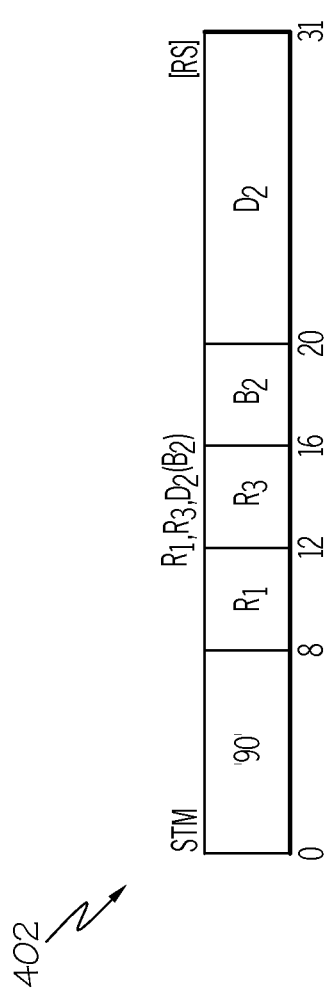
FIG. 4 shows one example of an STM instruction.
Figure 5:
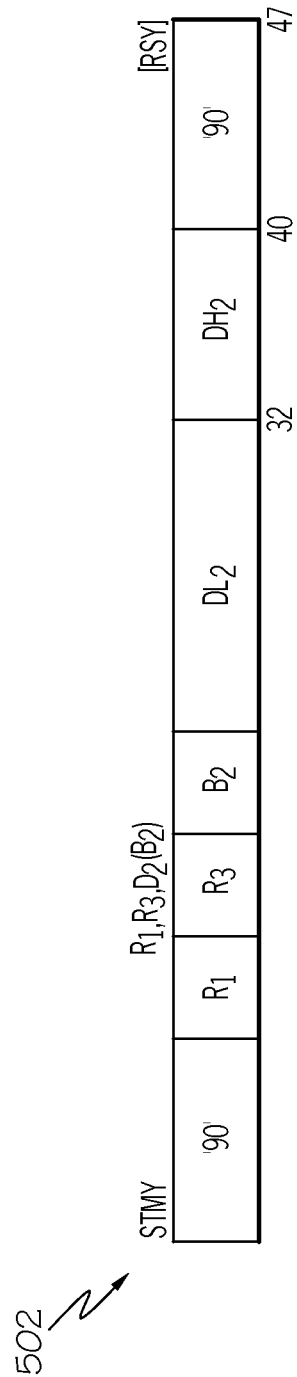
FIG. 5 shows one example of an STMY instruction.

FIGS. 4 and 5 illustrate an example of an STM 402 and STMY 502 instruction, respectively. In these examples, the 32-bit STMx instruction stores data from registers R1 to R3 to memory location address specified by B2 and D2. For example, FIGS. 4-5 show that R1 to R3 is the range of GPR to be stored. In this example, only the low words of the GPRs (bits 32:63) are stored. Displacement (D2) in the STM is 12 bits unsigned number (bits 20:31 of the instruction text). Displacement (D2) in the STMY is 20 bits signed number (bits 32:40 and 20:31 of the instruction text). The operand length of these instructions equal the number of bytes to be stored −1. The number of bytes to be stored is equal to 4× (R3−R1+1) (Note that R1 can be higher number than R3). For example, if R1=2, R3=7 then the number of bytes to be stored=4× (7−2+1)=24 bytes. Also, if R1=E, R3=1 the the number of bytes=4×4=16 (GPRs are E, F, 0, 1). The starting storage address, pointing to the leftmost byte, is equal to the contents of GPR-B2+D2 (Base+displacement), and the byte ending storage address=Contents of GPR-B2+D2+number of bytes to be stored minus 1.

Figure 6:
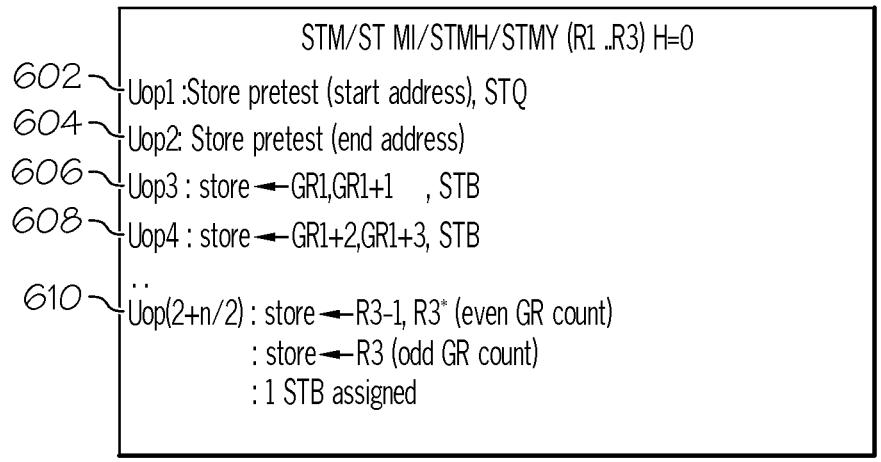
FIGS. 6-10 shows various examples of Uops created based on OSC history information and, in some embodiments, alignment information according to one or more embodiments of the present invention.

In a first example, the IDU 212 determines from the OSC hazard flag information that a STMx instruction is not associated with any previous OSC hazard encounters. The IDU 212 also determines that the STMx instruction is a 32-bit STMx instruction. The cracking unit 244 breaks the STMx instruction into a group of Uops which are then sent to the ISU 214 for issuing to the execution units. The number of Uops depends on the number of GRs to be stored. FIG. 6 shows an example of Uops for a 32-bit STMx instruction with no previous OSC hazard history.

As can be seen from FIG. 6, the cracking unit 244 has broken the 32-bit STMx instruction into a set of Uops ranging from Uop1 to Uop(2+n/2). Once the cracking unit 244 has formed the Uops, the IDU 244 sends the Uops to the ISU 214. In the current example, the ISU 214 issues Uop1 602 and Uop2 604 to the LSU 230 and Uop3 606 to Uop(2+n/2) 608 to the FXU 216. Uop1 602 and Uop2 604 are associated with the storage address cache address. Uop3 606 and onward are associated with the data to be stored in the memory (databeat formation).

In the example of FIG. 6, Uop1 602 performs a store pretest for the starting address of the STMx instruction and is issued to the LSU 230. At dispatch time, hardware allocates one store-queue entry in the STQ 234. Operands are GPR-B1 (base) and Address register-B1 (AR-base needed for translation in Address register mode). At execution time, the LSU 230 calculates the starting address of the storage data (=B2+D2). The LSU 230 examines the data cache line to examine if it is saved locally in the Dcache 204. The LSU 230 writes this address to the STQ entry. The LSU 230 also checks for any potential exception related to this storage access at this particular address, (e.g. translation exception, access exception like page faults, protection exception, etc.).

Uop2 604 is also issued to the LSU 230. Operands are GPR-B1 (base) and Address register-B1 (AR-base needed for translation in Address register mode). At execution time, the LSU 230 calculates the ending address of the storage data (=B2+D2+operand length). The LSU 230 examines the data cache line to examine if it is saved locally in the Dcache 204. Note that the STM storage data may have crossed a cache line or a page line. Also note that only D-cache line may be crossed by STM data (existing cache line size=256 bytes).

The LSU 230 also checks for any potential exception related to this storage access (e.g. translation exception, access exception like page faults, protection exception, etc.).

Uop3 606 is issued to the FXU 216. At dispatch time, one store buffer is allocated. Store buffer resources are used to track the number of bytes allocated to storage, but not yet stored in the cache. This Uop sends 8 bytes of data to memory if number of GRs is 2 or more. This Uop sends 4 bytes of data to memory if number of GRs is 1 (R3=R1). Operands are GPR-R1(32:63) and GPR-R1+1(32:63) if R3!=R1. If R3=R1, then only GPR-R1 is specified as an operand. The FXU 216 reads 2 GPRs (1 GR if R3=R1), 4 bytes from each, merges the bytes and sends these merged bytes as 8 bytes (4 bytes if R3=R1), i.e., a "databeat", to memory.

Uop4 608 to Uop(2+n/2) 610 are similar to Uop3 606. It should be noted that, in one embodiment, Uop10 is the last Uop available since the STM can only read 16 GRs at most, so 8 databeat Uops are needed (Uop3 . . . Uop10). These Uops are also issued to the FXU 216. At dispatch time, one store buffer is allocated. These Uops read the low word of 2 GRs (or 1 GR if number is odd). The GR's are R1+2 and R1+3. For Uopx (where x ranges from 3 to 10), GR reads are R1+((x−3)*2) and R1+((x−3)*2+1).

Figure 7:
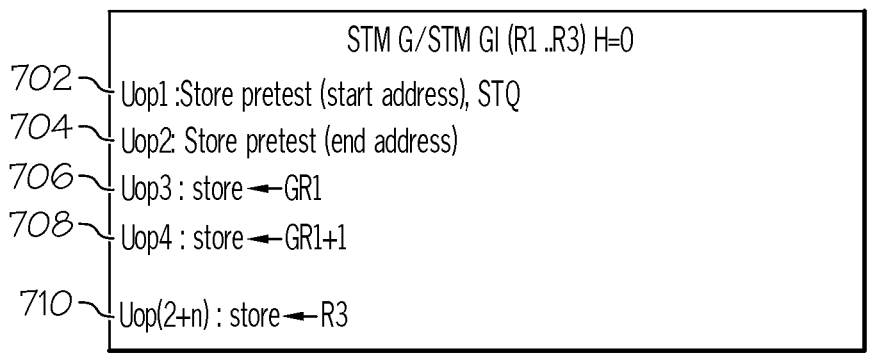

FIG. 7 shows another example of Uops. In particular, FIG. 7 shows one example of Uops for a 64-bit STMx (STM G or STM GI) instruction that has not previously encountered an OSC hazard. The instruction associated with the Uops of FIG. 7 is storing both the entire contents (all 64-bits) of the GPRs. As can be seen, the IDU 244 has broken the instruction into Uop1 702 to Uop(2+n) 710. Uop1 702 performs a store pre-test for the starting address of the STMx instruction and is issued to the LSU 230. At dispatch time, hardware allocates one store-queue entry in the STQ 234. Operands are GPR-B1 (base) and Address register-B1 (AR-base needed for translation in Address register mode). At execution time, the LSU 230 calculates the starting address of the storage data (=B2+D2). The LSU 230 examines the data cache line to examine if it is saved locally in the Dcache 204. The LSU 230 writes this address to the STQ entry. The LSU 230 also checks for any potential exception related to this storage access at this particular address, (e.g. translation exception, access exception like page faults, protection exception, etc.).

Uop2 704 is also issued to the LSU 230. Operands are GPR-B1 (base) and Address register-B1 (AR-base needed for translation in Address register mode). At execution time, the LSU 230 calculates the ending address of the storage data (=B2+D2+operand length). The LSU 230 examines the data cache line to examine if it is saved locally in the Dcache 204. The LSU 230 also checks for any potential exception related to this storage access (e.g. translation exception, access exception like page faults, protection exception, etc.).

Uop3 706 is issued to the FXU 216. At dispatch time, one store buffer is allocated. Store buffer resources are used to track the number of bytes allocated to storage, but not yet stored in the cache. This Uop sends 8 bytes of data to memory. The length of the store in this example is different than in FIG. 6. For example, in an STMG (or STMGI) operation, the number of bytes to be stored is equal to 8 times the number of registers specified by the range from R1 to R3. The number of bytes to be stored by an STMG (or STMGI) instruction ranges from 8 bytes when R1=R3 to 128 bytes when all of the 16 GPRs are specified. Uop4 708 to Uop(2+n) 710 are similar to Uop3 706. These Uops are also issued to the FXU 216. At dispatch time of these Uops, one store buffer is allocated for each. Each of the Uop3 706 to Uop(2+n) 710 reads one GR since they are storing 64-bits. For example, each Uop is taking 8 bytes from each GR and sending these 8 bytes to memory.

Figure 8:
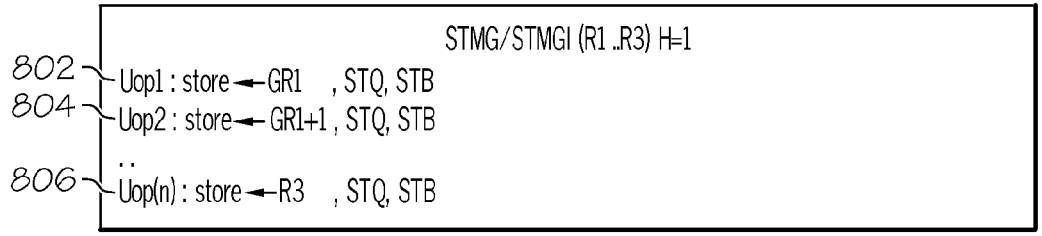

FIG. 8 shows yet another example of Uops. In particular, FIG. 8 shows one example of Uops for a 64-bit STMx (STMG STMGI) instruction that has previously encountered an OSC hazard, e.g., the OSC history flag is set to 1. The IDU 244 breaks up the STMx instruction into multiple store instructions. In other words, each Uop 802, 804, 806 resembles and performs as a separate store instruction with each Uop having its own STQ entry.

As can be seen from FIG. 8, the cracking unit 244 has broken the 64-bit STMx instruction into a set of Uops ranging from Uop 802 1 to Uop(n) 806. Once the cracking unit 244 has formed the Uops, the IDU 244 dispatches the Uops to the ISU 214. Each Uop is DUAL issued to the LSU 230 and to the FXU 216. Dual issuing is discussed in greater detail in the commonly owned and co-pending U.S. application Ser. No. 12/645,716, entitled "DUAL ISSUING OF COMPLEX INSTRUCTION SET INSTRUCTIONS", filed on Dec. 23, 2009, which is hereby incorporated by reference in its entirety. The ISU 214, in this example, first issues the Uops (Uop1 to Uop(n)) to the LSU 230, and then it issues then to the FXU 216. The LSU calculates the starting address and the ending address of the storage bytes associated with each Uop and saves this information in the STQ entry associated with the corresponding Uop. For example, Uop2 804 storage has a starting address=(B2+D2+8) and an ending address=(B2+D2+8+7) for a total of 8 bytes. Similarly, the LSU 230 calculates the starting and ending address for the storage bytes in Uop(n) 806 as (B2+D2+(n−1)*8) and (B2+D2+(n−1)*8+7), respectively. At dispatch time of the Uops, each Uop 802, 804, 806 is allocated one store queue entry and one store buffer. Therefore, each Uop reads 8 bytes from each GR and sends 8 bytes of data, i.e., a "databeat", to memory just as if the Uop was a standalone 8 bytes Store instruction.

Figure 9:
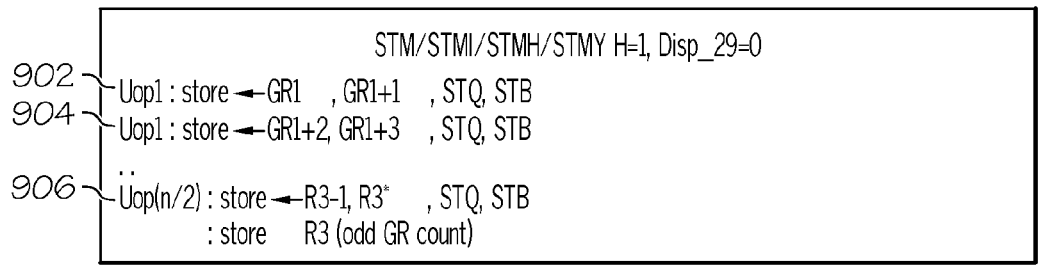

FIG. 9 shows another example of Uops. In particular, FIG. 9 shows one example of Uops for a 32-bit STMx instruction that has previously encountered an OSC hazard, e.g., the OSC history flag is set to 1. In one embodiment, the IDU also analyzes the displacement field (bit 29 of the instruction text) of the instruction to determine the data alignment instruction, i.e., double aligned or non-double word aligned. In this embodiment, the second bit of the displacement field can be either 1 or 0, where a 1 indicates double word aligned and bit 0 indicates non-double word aligned. However, the various embodiments are not limited to this example. It should be noted that the displacement flag is only relevant to 4 byte store instructions (e.g., 32-bit STMx instructions).

In the example of FIG. 9, the IDU 244 has determined, via the displacement flag, that the 32-bit STMx instruction store data is double word aligned, e.g., displacement flag is 0. Therefore, the databeats are immediately sized as 8 bytes. For example, the IDU 244 breaks the 32-bit STMx instruction into Uop1 902 to Uop(n/2) 906. Each of these Uops is a separate 8 bytes (or 4 bytes) instruction. At dispatch time, each Uop is allocated an entry in the STQ 234 and is also allocated one store buffer 236. These Uops send 8 bytes of data to memory if number of GRs is 2 or more. As in the example of FIG. 8, these Uops are dual issued to the LSU 230 and to the FXU 216. Each Uop is first issued to the LSU 230 where the LSU 230 calculates the starting and ending address associated with the storage bytes in the Uop. The Uop is then issued to the FXU 216 where the FXU 216 reads 2 GPRs (1 GR if R3=R1), 4 bytes from each, merges the bytes and sends these merged bytes as 8 bytes (4 bytes if R3=R1), i.e., a "databeat", to memory.

Figure 10:
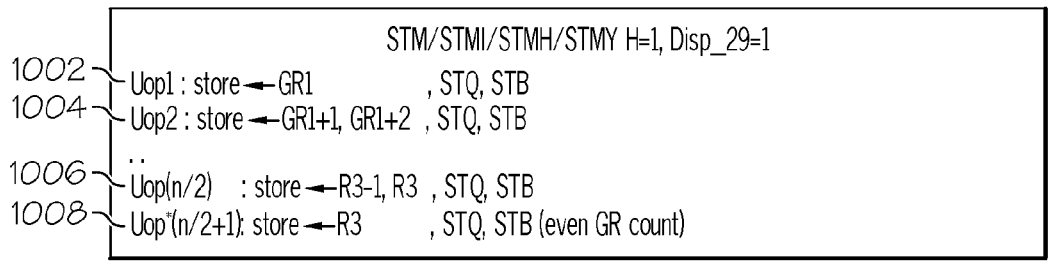
Figure 11:
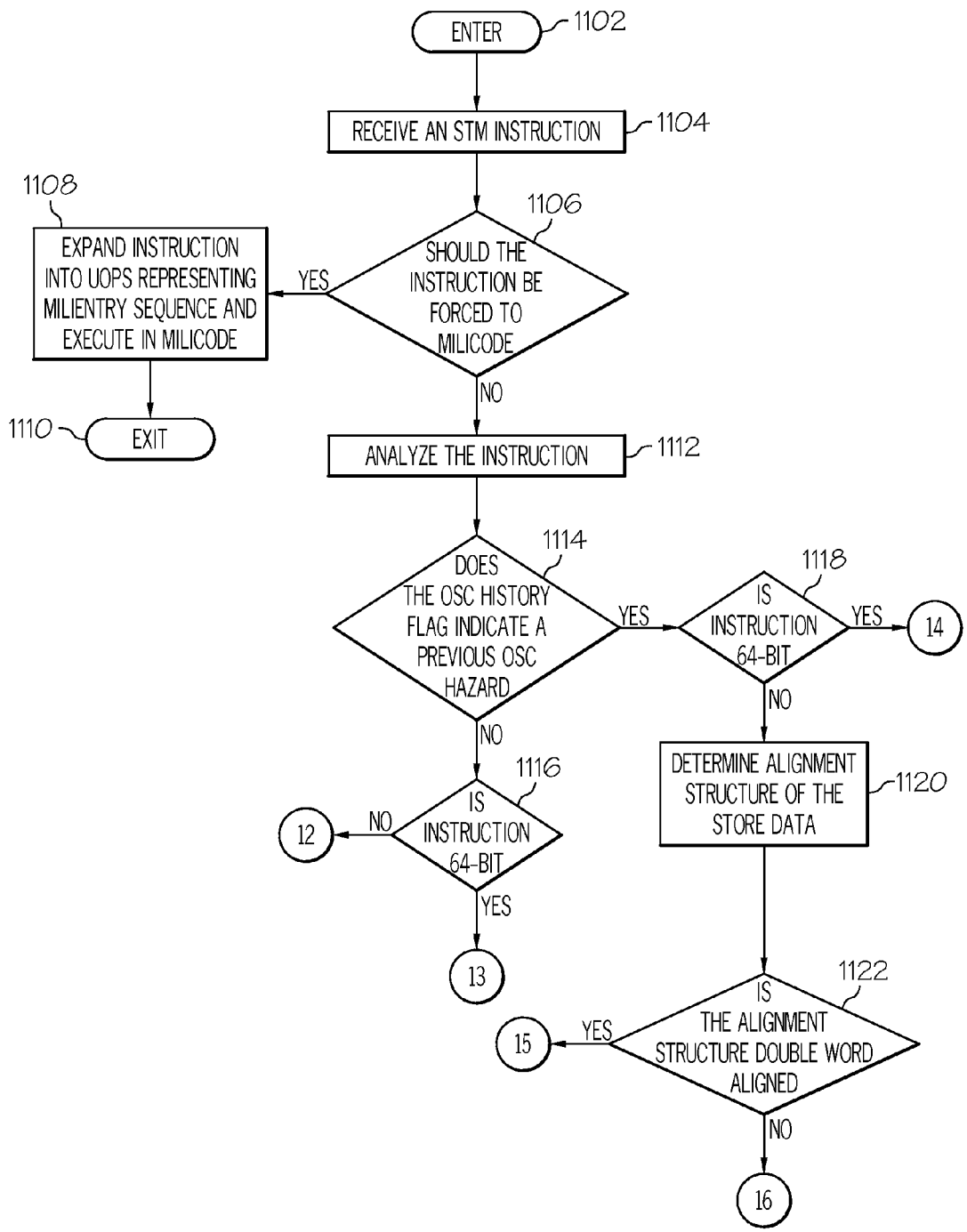
FIGS. 11-16 are operational flow diagrams illustrating various examples of cracking a STMx instruction based on OSC hazard history and alignment according to one or more embodiments of the present invention.

FIG. 10 shows yet another example of Uops. In particular, FIG. 10 shows one example of Uops for a 32-bit STMx instruction that has previously encountered an OSC hazard, e.g., the OSC history flag is set to 1 and has a displacement flag indicating that the 32-bit STMx instruction store data is word aligned, but not double word aligned, e.g., displacement flag is 1. Therefore, the first databeat is sized to by 4 bytes only (read one GR) and the remaining databeats are sized to be 8 bytes.

For example, FIG. 10 shows that the IDU 244 has broken up the STMx instruction into multiple 8 bytes (or 4 bytes) store instructions, Uop1 1002 to Uop(n/2) 1006 or Uop* (Uopn/2+1) 1008. Each of these Uops is allocated an entry in the STQ 234 and a store buffer 236, and are dual issued to the LSU 230 and to the FXU. At execution time of a Uop, the LSU 230 calculates the starting and ending address associated with the storage bytes in the Uop. The FXU 216, based on the first Uop, Uop1 1002, only reads 4 bytes from the GR and stores these 4 bytes in memory. The FXU 216, for the remaining Uops 1004 to 1008, reads 8 bytes from the GRs and stores these 8 bytes in memory.

The difference in cracking and handling of store multiple instructions based on an OSC history information and alignment information is visible in the examples shown in FIGS. 6-10. When OSC history is 0, as in examples for FIGS. 6-7, the storage data is treated as one block by only allocating a single STQ entry for the data and that STQ entry includes the starting address of the storage block and the ending address of the storage block. In contrast, the storage data is broken up into pieces of 8 bytes with each piece having its own STQ entry containing that starting address and the ending address of this particular piece. As a result, store multiple instructions with OSC history equal to 1 occupies more STQ resources and more issue slots since each Uop is now dual issued to LSU and to FXU, but are able to bypass any part of the storage data to a dependent load.

As can be seen from the above discussion, one advantage of the various embodiments of the present invention is that the hazards discussed above are effectively avoided when executing store multiple instructions. The IDU 214 uses the OSC history table to determine how to crack a STMx instruction. The STMx instruction is cracked so that all load instructions associated with an OSC hazard flag are made dependent on all prior store instructions associated with the same type of OSC hazard flag.

Operational Flow Diagram

FIGS. 11-16 are operational flow diagrams illustrating various examples of cracking a STMx instruction based on OSC hazard history and alignment. The operational flow diagram of FIG. 11 begins at step 1102 and flows directly into step 1104. The IDU 212, at step 1104, receives a STMx instruction from the IFU 210. The IDU 212, at step 1106, determines if the instruction should be forced to millicode based on control information. If the result of this determination is positive, the IDU 212, at step 1108, expands the instruction into a Uop set that represents a milli-entry sequence and the Uops execute which places in the microprocessor in millicode mode where new stream of instructions stored in local system area are executed to emulate the STMx execution behavior. The control flow then exits at step 1110. If the result of this determination is negative, the IDU 212, at step 1112, analyzes the instruction.

The IDU 212, at step 1114, determines if the OSC history flag of the instruction indicates that the instruction has previously encountered an OSC hazard. If the result of this determination is negative the IDU 212, at step 1116, determines if the instruction is a 64-bit instruction. If the result of this determination is negative, the control flows to entry point A of FIG. 12. If the result of this determination is positive, the control flows to entry point B of FIG. 13. If the result of the determination at step 1114 is positive the IDU 212, at step 1118, determines if the instruction is a 64-bit instruction. If the result of this determination is positive, the control flows to entry point C of FIG. 14. If the result of this determination is negative the IDU 212, at step 1120, determines the alignment structure of the store data. The IDU 212, at step 1122, determines if the alignment structure is double word aligned. If the result of this determination is positive, the control flows to entry point D of FIG. 15. If the result of this determination is negative (i.e., the store data is word aligned but not double word aligned), the control flows to entry point E of FIG. 16.

Figure 12:
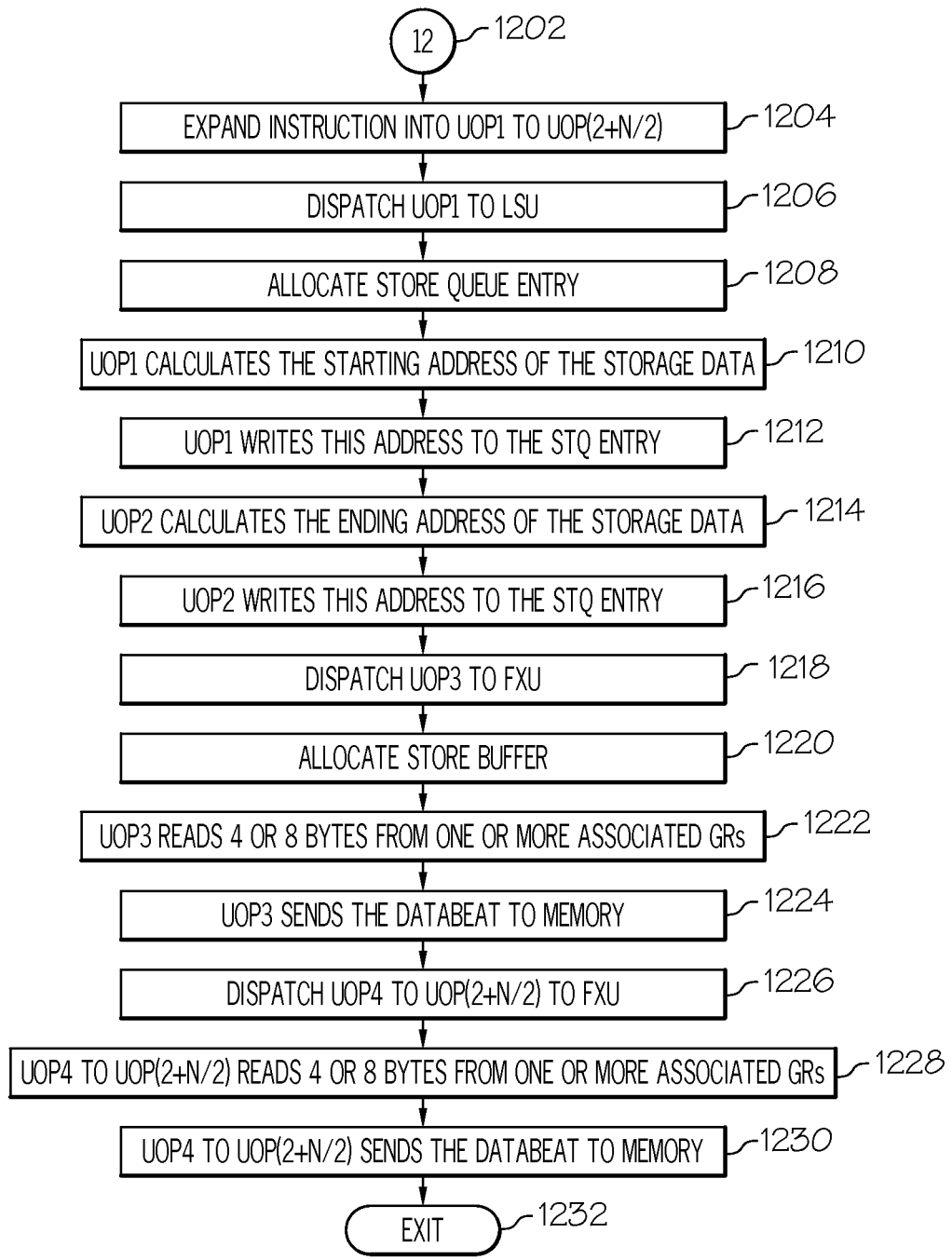

FIG. 12 shows an operational flow when the IDU 212 determines that the instruction is a 32-bit instruction and that the OSC history flag of the instruction indicates that the instruction has not previously encountered an OSC hazard. The control flow enters at entry point A, at step 1202, and continues directly to step 1204. The IDU 212, at step 1204, expands the instruction into Uop1 to Uop(2+n/2). The IDU 212, at step 1206, dispatches Uop1 to the ISU 214 and the ISU 214 issued Uop1 to the LSU 230. It should be noted that the Uops are dispatched to the ISU 214 in groups of fixed sizes (e.g., groups of 3 or 4) and stored in an Issue Queue (Reorder buffer). Uops are then read from the Issue Queue and issued to the execution units. A Uop from an STMx instruction can be issued while other Uops are still dispatched. The allocation of STQ and STB are done at dispatch time. The STQ entry is updated with the memory address calculated at execution time in the LSU 230. The Store buffer is updated with data (databeat) originated from the FXU 216

A store queue entry, at step 1208, is allocated. Uop1, at step 1210, calculates the starting address of the storage data when executed in the LSU 214 Uop1, at step 1212, writes this address to the store queue entry. Uop2, at step 1214, calculates the ending address of the storage data when executed in the LSU 214. Uop2, at step 1216, writes this address to the store queue entry. The IDU 212, at step 1218, dispatches Uop3 so to be issued to the FXU 216. A store buffer, at step 1222, is allocated. Uop3, at step 1222, reads 4 (if only reading from 1 GR) or 8 bytes (if reading from 2 GRs) from one or more GRs, respectively when executed in the FXU 216. Uop3, at step 1224, sends its databeat to memory 204. The IDU 212, at step 1226, dispatches Uop4 to Uop(2+n/2) to be issued to the FXU 216. Uop4 to Uop(2+n/2), at step 1228, reads 4 (if only reading from 1 GR) or 8 bytes (if reading from 2 GRs) from one or more GRs, respectively. Uop4 to Uop(2+n/2), at step 1230, sends their databeat to memory 204. The control flow then exits at step 1232.

Figure 13:
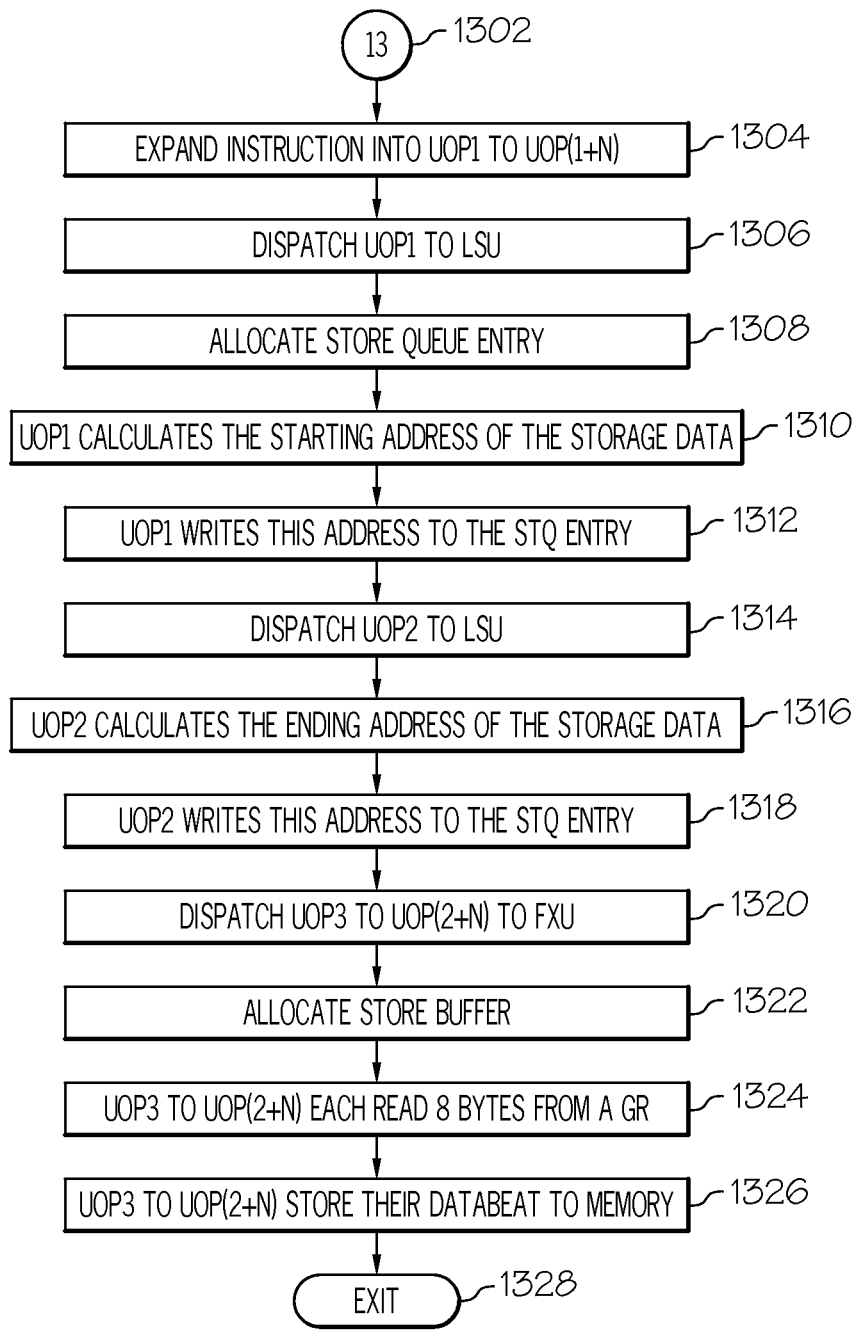

FIG. 13 shows an operational flow when the IDU 212 determines that the instruction is a 64-bit instruction and that the OSC history flag of the instruction indicates that the instruction has not previously encountered an OSC hazard. The control flow enters at entry point B, at step 1302, and continues directly to step 1304. The IDU 212, at step 1304, expands the instruction into Uop1 to Uop(2+n). The IDU 212 dispatches the Uops to the ISU 214 and ISU 214 issues them to the LSU 230 or FXU 216. The IDU 212, at step 1306, dispatches Uop1 to be issued to the LSU 230. A store queue entry, at step 1308, is allocated. Uop1, at step 1310, calculates the starting address of the storage data. Uop1, at step 1312, writes this address to the store queue entry.

The IDU 212, at step 1314, dispatches Uop2 to be issued to the LSU 230. Uop2, at step 1316, calculates the ending address of the storage data. Uop2, at step 1318, writes this address to the store queue entry. The IDU 212, at step 1320, dispatches Uop3 to Uop(2+n) to be issued to the FXU 216. A store buffer, at step 1322, is allocated for each dispatched Uop. Uop3 to (2+n), at step 1324, each read 8 bytes from a GR. Uop3 to Uop(2+n), at step 1326, store their databeat to memory 204. The control flow then exits at step 1328.

Figure 14:
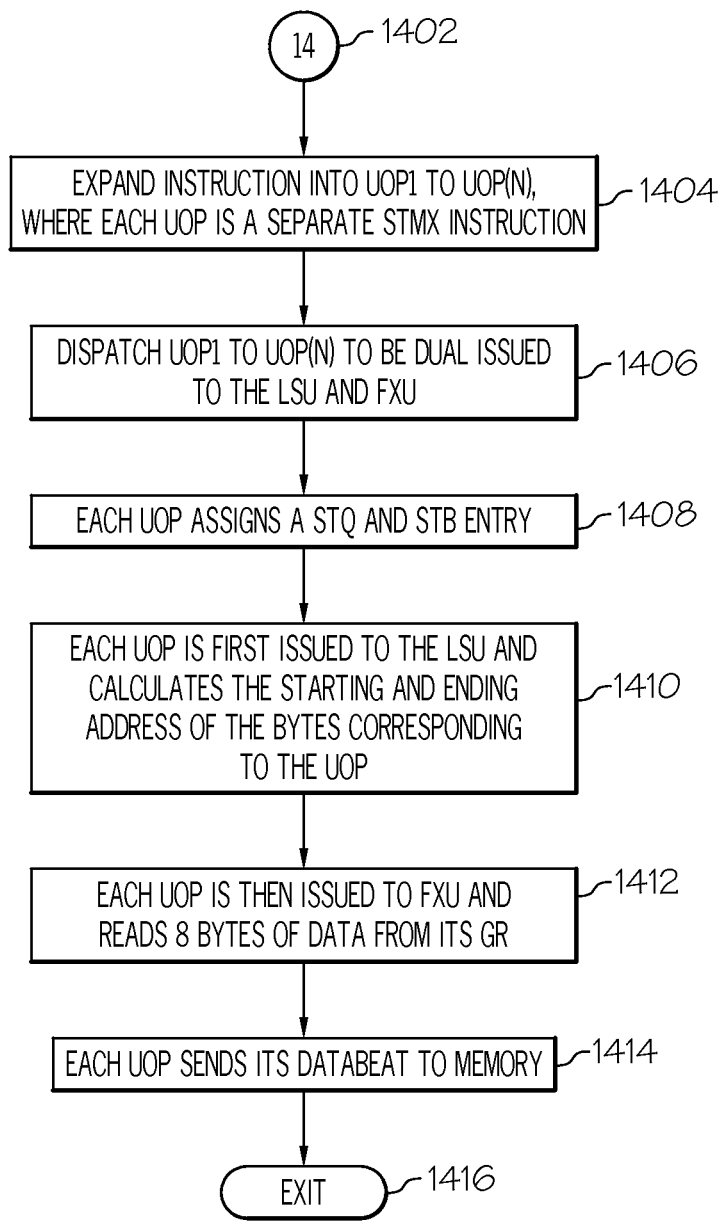

FIG. 14 shows an operational flow when the IDU 212 determines that the instruction is a 64-bit instruction and that the OSC history flag of the instruction indicates that the instruction has previously encountered an OSC hazard. The control flow enters at entry point C, at step 1402, and continues directly to step 1404. The IDU 212, at step 1404, expands the instruction into Uop1 to Uop(n), where each Uop is a separate 8 bytes store instruction. The IDU 212, at step 1406, dispatches Uop1 to Uop(n) to be dual issued to the LSU 230 and to the FXU 216. Each Uop, at step 1408, assign a STQ and a STB entry. Each Uop, at step 1410, is first issued to the LSU 230 and calculates the starting and ending address of the bytes corresponding to this particular Uop. Each Uop, at step 1412, is then issued to the FXU 216 and reads the 8 bytes of data from its GR. Each Uop, at step 1414, sends its databeat to memory 204. The control flow then exits at step 1416.

Figure 15:
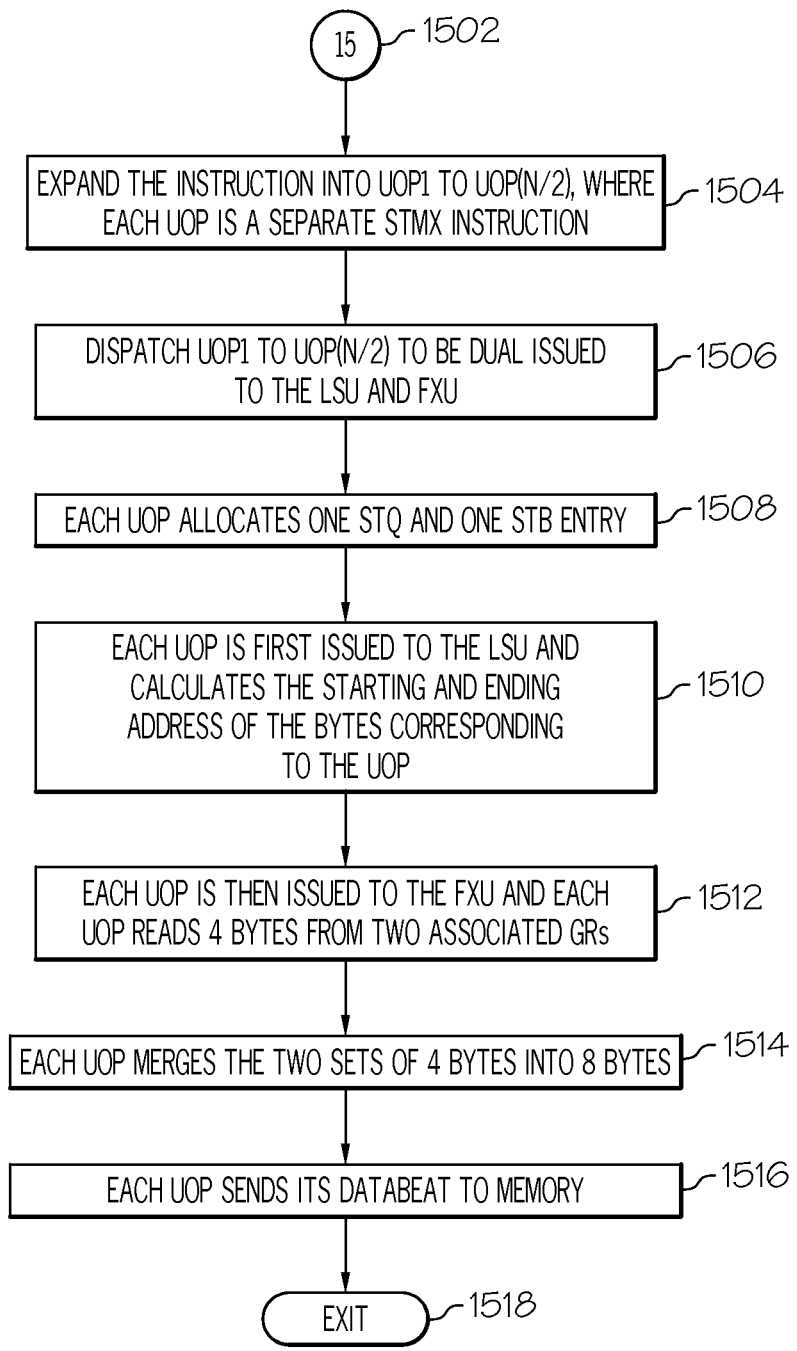

FIG. 15 shows an operational flow when the IDU 212 determines that the instruction is a 64-bit instruction; that the OSC history flag of the instruction indicates that the instruction has previously encountered an OSC hazard; and the alignment structure is double word aligned. The control flow enters at entry point D, at step 1502, and continues directly to step 1404. The IDU 212, at step 1504, expands the instruction into Uop1 to Uop(n/2), where each Uop is a separate 8 bytes (or 4 bytes) store instruction. The last Uop is similar to a 4 bytes store instruction if the number of the GRs to be read and stored is odd. The IDU 212, at step 1506, dispatches Uop1 to Uop(n/2) to be dual issued to the LSU 230 and to the FXU 216. Each Uop, at step 1508, allocates one STQ and one STB entry. Each Uop, at step 1510, is first issued to the LSU 230 and calculates the starting and ending address of the bytes associated with this particular Uop. Each Uop, at step 1512, is then issued to the FXU 216 and reads 4 bytes of data from two associated GRs. Each Uop, at step 1514, merges its two sets of 4 bytes into 8 bytes. Each Uop, at step 1516, sends its databeat to memory 204. The control flow then exits at step 1518.

Figure 16:
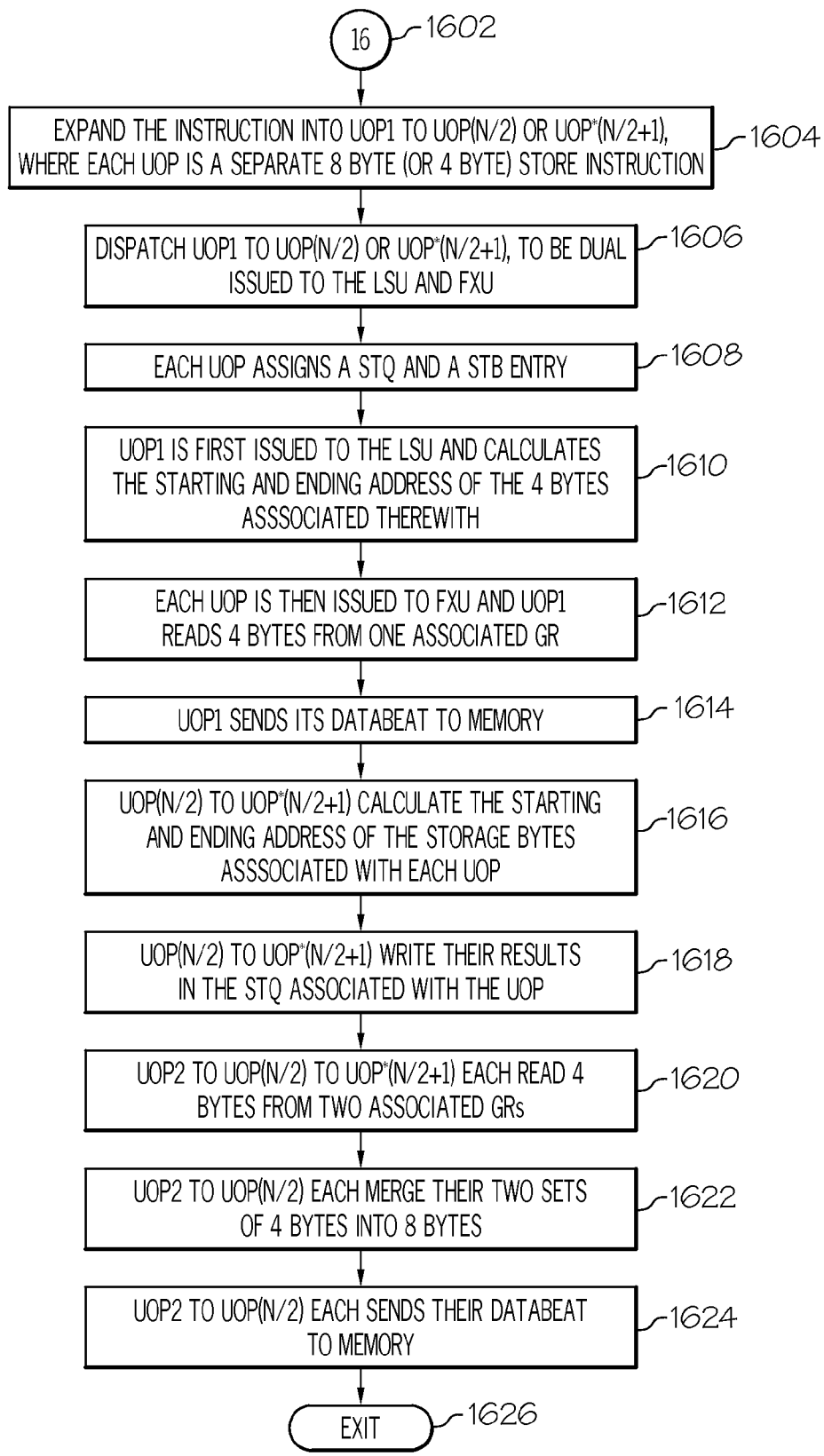

FIG. 16 shows an operational flow when the IDU 212 determines that the instruction is a 32-bit instruction; that the OSC history flag of the instruction indicates that the instruction has previously encountered an OSC hazard; and the alignment structure is word aligned, but not double word aligned. The control flow enters at entry point D, at step 1602, and continues directly to step 1404. The IDU 212, at step 1604, expands the instruction into Uop1 to Uop(n/2) or Uop*(n/2+1), where each Uop is a separate 8 bytes (or 4 bytes) store instruction. The IDU 212, at step 1606, dispatches Uop1 to Uop(n/2) or Uop*(n/2+1) to be dual issued to the LSU 230 the FXU 216. Each Uop, at step 1608, assigns a STQ and STB entry. Uop1, at step 1610, is first issued to the LSU 230 and calculates the starting address and ending address of the 4 bytes associated with Uop1. Uop1, at step 1612, is then issued to FXU 216 and reads 4 bytes from one associated GR. Uop1, at step 1614, sends its databeat to memory 204. Uop(n/2) to Uop*(n/2+1), at step 1616, calculate the staring and ending address of the storage bytes associated with each Uop. Uop (n/2) to Uop*(n/2+1), at step 1618, then write their results in the STQ corresponding to the Uop. Uop(n/2) to Uop*(n/2+1), at step 1620, each read 8 bytes of data from two associated GRs. Uop(n/2) to Uop*(n/2+1), at step 1622, each merge its two sets of 4 bytes into 8 bytes. Uop(n/2) to Uop*(n/2+1), at step 1624, each send its databeat to memory 204. The control flow then exits at step 1626.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a program product via CD or DVD, e.g. CD 916, CD ROM, or other form of recordable media, or via any type of electronic transmission mechanism.

What is claimed is:

1. A method for managing multiple store instructions, the method comprising:

detecting at least one store multiple instruction;

determining that a flag is associated with the at least one store multiple instruction, wherein the flag indicates that the at least one store multiple instruction has previously encountered an operand store compare hazard;

organizing, as part of at least one decoding operation, the at least one store multiple instruction into a set of units of operation based on the determining, wherein each unit of operation in the set of units of operation is executable in parallel and out-of-order with at least other units of operations in the set of units of operations;

sending, after the organizing, the set of units of operation to an instruction sequencer unit;

issuing, by the instruction sequencer unit, each of a first subset of units of operation in the set of units of operation to at least a first execution unit and each of a second subset of units of operation in the set of units of operation to at least a second execution unit, wherein the first execution unit is different than the second execution unit; and executing, after the sending, the first subset of units of operation and the second subset of units of operation by the at least first execution unit and the at least second execution unit, respectively, wherein two or more units in at least one of the first and second subsets of units of operation are executed independent of each other, wherein the executing avoids the operand store compare hazard previously encountered by the at least one store multiple instruction.

2. The method of claim 1, further comprising:

determining, based on determining that the flag is associated with the at least one store multiple instruction, a word alignment structure of the at least one store multiple instruction.

3. The method of claim 2, wherein the organizing is based on the word alignment structure that has been determined.

4. The method of claim 2, wherein the organizing further comprises:

determining that the at least one store multiple instruction is associated with one of a 32-bit General Purpose Register and a 64-bit General Purpose Register.

5. The method of claim 1, wherein each unit of operation in the set of units of operation is a separate store instruction.

6. The method of claim 1, wherein the executing further comprises:

allocating a store queue and a store buffer for each unit of operation in at least one of the first and second subsets of units of operation; and reading, by each unit of operation in the at least one of the first and second subsets of units of operation, eight bytes of data from a general register associated therewith; and storing, by each unit of operation in the at least one of the first and second subsets of units of operation, the eight bytes of data to a memory.

7. The method of claim 1, further comprising:

determining that a word alignment structure associated with the at least one store multiple instruction is a double word alignment structure;

allocating a store queue and a store buffer for each unit of operation in the set of units of operation, wherein the first and second subsets of units of operation that are being executed are organized based on the word alignment structure associated with the at least one store multiple instruction being a double word alignment structure, and wherein the executing further comprises:
  reading, by each unit of operation in at least one of the first and second subsets of units of operation, a first set of four bytes from a first general registers associated therewith and a second set of four bytes from a second general register associated therewith;
  merging, by each unit of operation in the set of units of operation, the first set of four bytes and a second set of four bytes into eight bytes; and
  storing, by each unit of operation in the set of units of operation, the eight bytes in a memory.

8. The method of claim 1, further comprising:

determining that a word alignment structure associated with the at least one store multiple instruction is a non-double word alignment structure;

allocating a store queue and a store buffer for each unit of operation in the set of units of operation, wherein the first and second subsets of units of operation that are being executed are organized based on the word alignment structure associated with the at least one store multiple instruction being a non-double word alignment structure, and wherein the executing further comprises:
  reading, by a first unit of operation in at least one of the first and second subsets of units of operation, four bytes from one general register associated therewith;
  storing, by the first unit of operation, the four bytes in a memory;
  reading, by each unit of operation in a remaining set of units of operation in the at least one of the first and second subsets of units of operation, a first set of four bytes from a first general registers associated therewith and a second set of four bytes from a second general register associated therewith;
  merging, by each unit of operation in a remaining set of units of operation in the at least one of the first and second subsets of units of operation, the first set of four bytes and a second set of four bytes into eight bytes; and
  storing, by each unit of operation in a remaining set of units of operation in the at least one of the first and second subsets of units of operation, the eight bytes in a memory.

9. A method for managing multiple store instructions, the method comprising:

detecting at least one store multiple instruction;

determining that a flag is associated with the at least one store multiple instruction, wherein the flag indicates that the at least one store multiple instruction has not previously encountered an operand store compare hazard;

organizing, during at least one decoding cycle, the at least one store multiple instruction into a set of units of operation based on the flag indicating that the at least one store multiple instruction has not previously encountered an operand store compare hazard, wherein each unit of operation in the set of units of operation is executable in parallel and out-of-order with at least other units of operations in the set of units of operations;

sending, after the organizing, the set of units of operation to an instruction sequencer unit;

issuing, by the instruction sequencer unit, each of a first subset of units of operation in the set of units of operation to at least a first execution unit and each of a second subset of units of operation in the set of units of operation to at least a second execution unit, wherein the first execution unit is different than the second execution unit; and executing, after the sending, the first subset of units of operation and the second subset of units of operation by the at least first execution unit and the at least second execution unit, respectively, wherein two or more units in at least one of the first and second subsets of units of operation are executed independent of each other, wherein the executing avoids the operand store compare hazard not previously encountered by the at least one store multiple instruction.

10. The method of claim 9, further comprising:

determining that the at least one store multiple instruction associated with a 32-bit instruction;

allocating one store queue entry;

allocating one store buffer for the set of units of operation, wherein the first and second subsets of units of operation that are being executed are organized based on the at least one store multiple instruction comprising 32-bit operands, and wherein the executing further comprises:
  calculating, by a first unit of operation in at least one of the first and second subsets of units of operation, a starting address of a set of storage data associated with the at least one store multiple instruction;
  storing, by the first unit of operation, the starting address in the store queue entry;
  calculating, by a second unit of operation in at least one of the first and second subsets of units of operation, an ending address of the set of storage data;
  storing, by the second unit of operation, the ending address in the store queue entry;
  reading, by each unit of operation in a remaining set of units of operation in the at least one of the first and second subsets of units of operation, one of a set of four bytes and a set of 8 bytes from one or more general registers associated therewith; and
  reading, by each unit of operation in the remaining set of units of operation, the one of the set of four bytes and the set of 8 bytes in a memory.

11. The method of claim 9, further comprising:

determining that the at least one store multiple instruction comprises 32-bit operands;

allocating one store queue entry;

allocating one store buffer for the set of units of operation, wherein the first and second subsets of units of operation that are being executed are organized based on the at least one store multiple instruction being a 64-bit instruction, and wherein the executing further comprises:
  calculating, by a first unit of operation in at least one of the first and second subsets of units of operation, a starting address of a set of storage data associated with the at least one store multiple instruction;

storing, by the first unit of operation, the starting address in the store queue entry;

calculating, by a second unit of operation in the at least one of the first and second subsets of units of operation, an ending address of the set of storage data;

storing, by the second unit of operation, the ending address in the store queue entry;

reading, by each unit of operation in a remaining set of units of operation in the at least one of the first and second subsets of units of operation, a set of 8 bytes from one general register associated therewith; and reading, by each unit of operation in the remaining set of units of operation, the set of 8 bytes in a memory.

12. An information processing system for managing multiple store instructions, the information processing system comprising:

a memory; and a processor communicatively coupled to the memory, wherein the processor comprises a cracking unit and the cracking unit is configured to perform a method comprising:

detecting at least one store multiple instruction;

determining that a flag is associated with the at least one store multiple instruction, wherein the flag indicates that the at least one store multiple instruction has previously encountered an operand store compare hazard;

organizing, during at least one decoding cycle, the at least one store multiple instruction into a set of units of operation based on the determining, wherein each unit of operation in the set of units of operation is executable out-of-order, and wherein the store multiple instruction is organized differently based on a history of operand store compare hazards encountered by the store multiple instruction and an address alignment of the store multiple instruction; and sending the set of units of operation to an instruction sequencer unit; and executing, after the sending, a first subset of the set of units of operation by at least a first execution unit and at least a second subset of the set of units of operation by at least a second execution unit, the first execution unit being different than the second execution unit, wherein two or more units in the first subset and the second subset of the set of units of operations are executed independent of each other, and wherein the executing avoids the operand store compare hazard previously encountered by the at least one store multiple instruction.

13. The information processing system of claim 12, wherein the executing further comprises:

allocating a store queue and a store buffer for each unit of operation in the set of units of operation; and calculating a starting address and an ending address, for each unit of operation in the set of units of operation, where a set of unit of operation data is to be stored;

reading, by each unit of operation in the set of units of operation, eight bytes of data from a general register associated therewith; and storing, by each unit of operation in the set of units of operation, the eight bytes of data to a memory.

14. The information processing system of claim 12, wherein the cracking unit is further for:

determining that a word alignment structure associated with the at least one store multiple instruction is a double word alignment structure;

allocating a store queue and a store buffer for each unit of operation in the set of units of operation, wherein the set of units of operation that are being executed are organized based on the word alignment structure associated with the at least one store multiple instruction being a double word alignment structure, and wherein the executing further comprises:

calculating a memory starting address and a memory ending address for each unit of operation;

reading, by each unit of operation in the set of units of operation, a first set of four bytes from a first general registers associated therewith and a second set of four bytes from a second general register associated therewith;

merging, by each unit of operation in the set of units of operation, the first set of four bytes and a second set of four bytes into eight bytes; and storing, by each unit of operation in the set of units of operation, the eight bytes in a memory.

15. The information processing system of claim 12, wherein the cracking unit is further for:

determining that a word alignment structure associated with the at least one store multiple instruction is a non-double word alignment structure;

allocating a store queue and a store buffer for each unit of operation in the set of units of operation, wherein the set of units of operation that are being executed are organized based on the word alignment structure associated with the at least one store multiple instruction being a non-double word alignment structure, and wherein the executing further comprises:

calculating a memory starting address and a memory ending address for each unit of operation;

reading, by a first unit of operation in the set of units of operation, four bytes from one general register associated therewith;

storing, by the first unit of operation, the four bytes in a memory;

reading, by each unit of operation in a remaining set of units of operation in the set of units of operation, a first set of four bytes from a first general registers associated therewith and a second set of four bytes from a second general register associated therewith;

merging, by each unit of operation in a remaining set of units of operation in the set of units of operation, the first set of four bytes and a second set of four bytes into eight bytes; and storing, by each unit of operation in a remaining set of units of operation in the set of units of operation, the eight bytes in a memory.

16. A computer program product for managing multiple store instructions, the computer program product comprising:

a non-transitory storage medium readable by a processing circuit and storing instructions for execution by the processing circuit for performing a method comprising:

detecting at least one store multiple instruction;

determining that a flag is associated with the at least one store multiple instruction, wherein the flag indicates that the at least one store multiple instruction has previously encountered an operand store compare hazard;

organizing, as part of at least one decoding operation, the at least one store multiple instruction into a set of units of operation based on the determining, wherein each unit of operation in the set of units of operation is executable in parallel and out-of-order with at least other units of operations in the set of units of operation;

sending, after the organizing, the set of units of operation to an instruction sequencer unit;

issuing, by the instruction sequencer unit, each of a first subset of units of operation in the set of units of operation to at least a first execution unit and each of a second subset of units of operation in the set of units of operation to at least a second execution unit, wherein the first execution unit is different than the second execution unit; and executing, after the sending, the first subset of units of operation and the second subset of units of operation by the at least first execution unit and the at least second execution unit, respectively, wherein two or more units in at least one of the first and second subsets of units of operation are executed independent of each other, wherein the executing avoids the oper- and store compare hazard previously encountered by the at least one store multiple instruction.

17. The computer program product of claim 16, wherein the method further comprises:
determining, based on determining that the flag is associated with the at least one store multiple instruction, a word alignment structure of the at least one store multiple instruction, wherein the organizing is based on the word alignment structure that has been determined.

18. The computer program product of claim 16, wherein the executing further comprises:
allocating a store queue and a store buffer for each unit of operation in at least one of the first and second subsets of units of operation; and
calculating a starting address and an ending address, for each unit of operation in the at least one of the first and second subsets of units of operation, where a set of unit of operation data is to be stored;
reading, by each unit of operation in the at least one of the first and second subsets of units of operation, eight bytes of data from a general register associated therewith; and
storing, by each unit of operation in the at least one of the first and second subsets of units of operation, the eight bytes of data to a memory.

19. The computer program product of claim 16, wherein the method further comprises:
determining that a word alignment structure associated with the at least one store multiple instruction is a double word alignment structure;
allocating a store queue and a store buffer for each unit of operation in the set of units of operation,
wherein the first and second subsets of units of operation that are being executed are organized based on the word alignment structure associated with the at least one store multiple instruction being a double word alignment structure, and
wherein the executing further comprises:
calculating a memory starting address and a memory ending address for each unit of operation;
reading, by each unit of operation in at least one of the first and second subsets of units of operation, a first set of four bytes from a first general registers associated therewith and a second set of four bytes from a second general register associated therewith;
merging, by each unit of operation in the at least one of the first and second subsets of units of operation, the first set of four bytes and a second set of four bytes into eight bytes; and
storing, by each unit of operation in the at least one of the first and second subsets of units of operation, the eight bytes in a memory.

20. The computer program product of claim 16, wherein the method further comprises:
determining that a word alignment structure associated with the at least one store multiple instruction is a non-double word alignment structure;
allocating a store queue and a store buffer for each unit of operation in the set of units of operation,
wherein the first and second subsets of units of operation that are being executed are organized based on the word alignment structure associated with the at least one store multiple instruction being a non-double word alignment structure, and
wherein the executing further comprises:
calculating a memory starting address and a memory ending address for each unit of operation;
reading, by a first unit of operation in at least one of the first and second subsets of units of operation, four bytes from one general register associated therewith;
storing, by the first unit of operation, the four bytes in a memory;
reading, by each unit of operation in a remaining set of units of operation in the at least one of the first and second subsets of units of operation, a first set of four bytes from a first general registers associated therewith and a second set of four bytes from a second general register associated therewith;
merging, by each unit of operation in a remaining set of units of operation in the at least one of the first and second subsets of units of operation, the first set of four bytes and a second set of four bytes into eight bytes; and
storing, by each unit of operation in a remaining set of units of operation in the at least one of the first and second subsets of units of operation, the eight bytes in a memory.

* * * * *